Jan. 19, 1965  A. P. BUIE, JR  3,165,880
FRUIT PICKING AND TRANSPORTING DEVICE
Filed Dec. 22, 1961  3 Sheets-Sheet 1
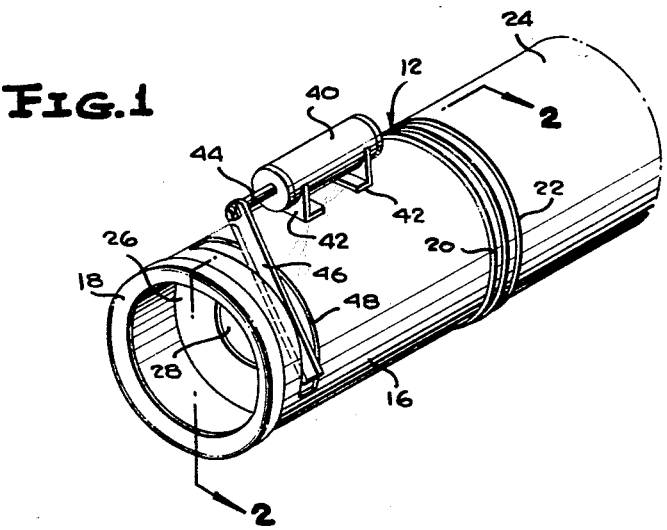
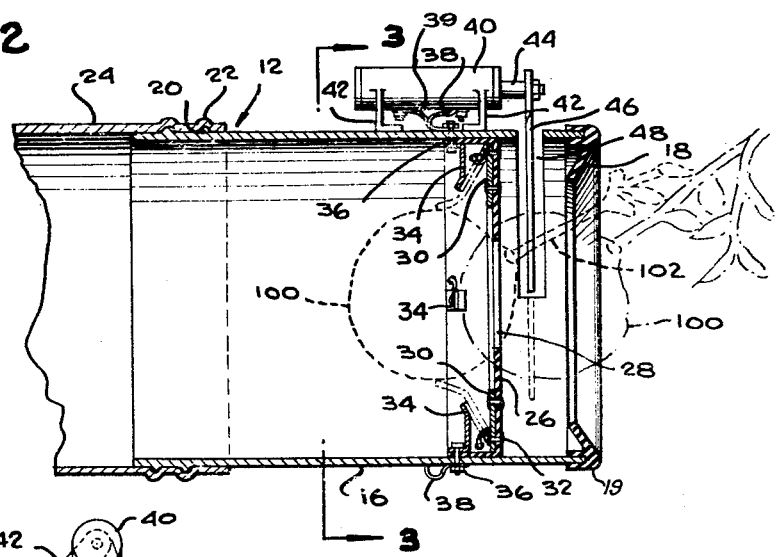
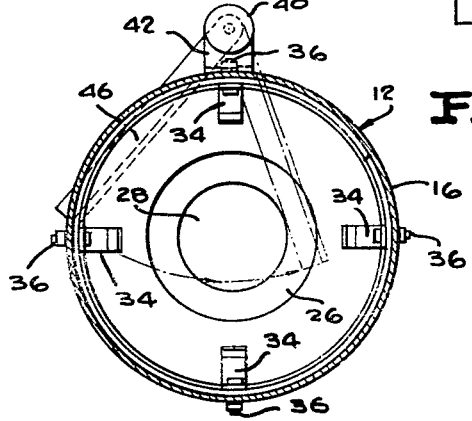
INVENTOR.
ARCHIE P. BUIE, JR.
BY
Gustave Miller
ATTORNEY

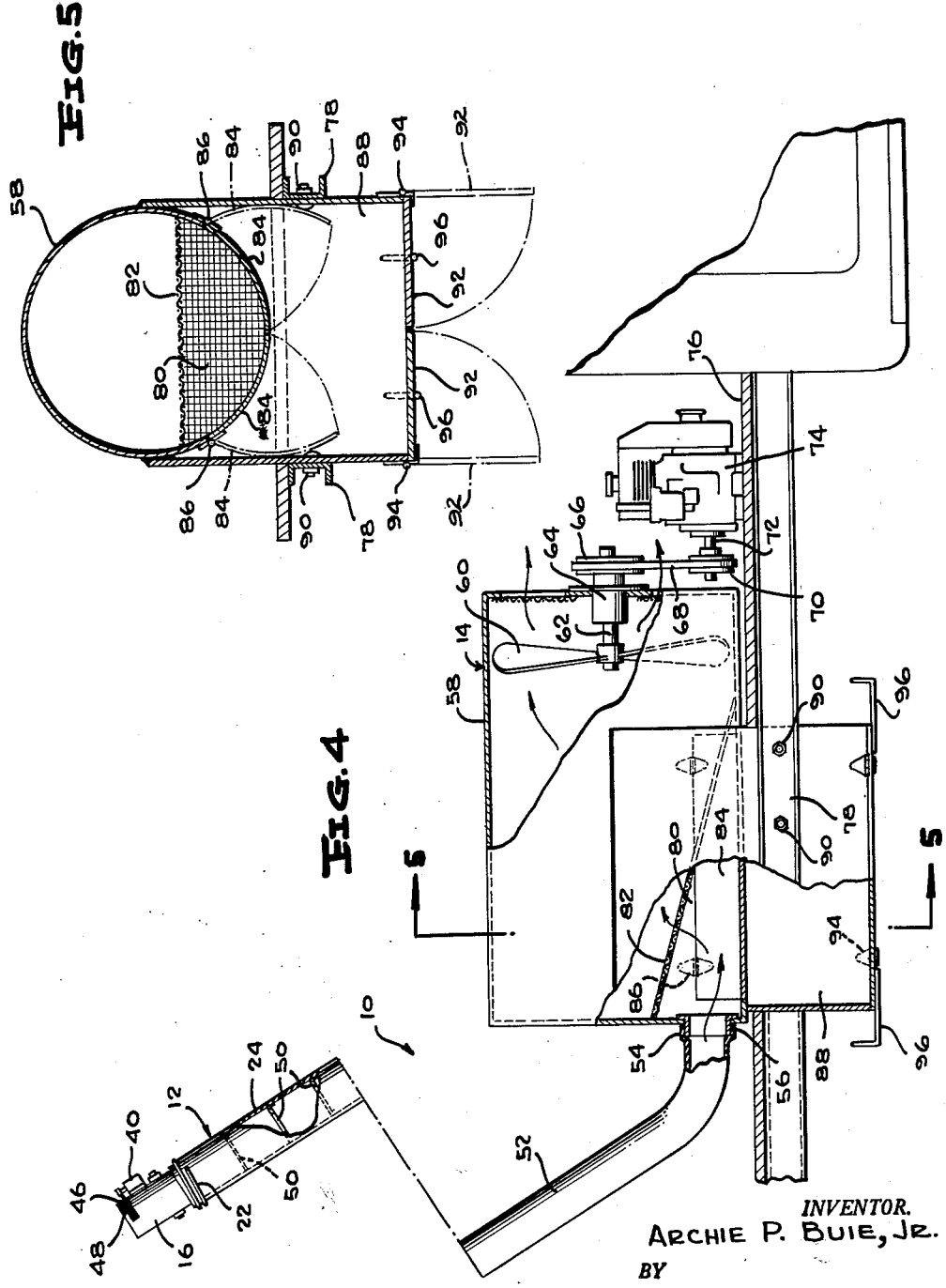

Jan. 19, 1965  A. P. BUIE, JR  3,165,880
FRUIT PICKING AND TRANSPORTING DEVICE
Filed Dec. 22, 1961  3 Sheets-Sheet 3

INVENTOR
ARCHIE P. BUIE, JR.

BY *Gustave Miller*

ATTORNEY ively. The blades 148 are actuated by motors energized by photoelectric cells 150.

United States Patent Office
3,165,880
Patented Jan. 19, 1965

3,165,880
FRUIT PICKING AND TRANSPORTING DEVICE
Archie P. Buie, Jr., Maitland, Fla.
(Rte. 1, Box 962A, Longwood, Fla.)
Filed Dec. 22, 1961, Ser. No. 161,644
13 Claims. (Cl. 56—336)

This invention relates to a fruit picking device, and it particularly relates to an improved device of the aforesaid type which automatically picks the fruit and conveys it to a proper gathering area.

There have been other automatic fruit picking machines provided heretofore. However, these prior machines were generally unduly complex and expensive, both to construct and maintain and, at the same time, could not adequately perform the picking function for fruits on tree stems or the like in a sufficiently efficient and economical manner.

It is one object of the present invention to overcome the above-mentioned difficulties by providing an automatic picking and transporting device which is effectively utilized for picking oranges, apples and the like and which is relatively simple both in construction and operation.

Another object of the present invention is to provide a fruit picking and transporting device, of the aforesaid type, which is easily transportable either by hand or by a vehicle.

Other objects of the present invention are to provide an improved fruit picking and transporting device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings, in which:

FIG. 1 is a perspective view of the picker head portion of the device illustrated as embodying the present invention.

FIG. 2 is a fragmentary sectional view, on an enlarged scale, taken on line 2—2 of FIG. 1.

FIG. 3 is a cross-sectional view taken on line 3—3 of FIG. 2.

FIG. 4 is a side view, partly in section and partly in elevation, of the full assembly including the head portion and transporter portion.

FIG. 5 is a sectional view taken on line 5—5 of FIG. 4.

Figure 6:
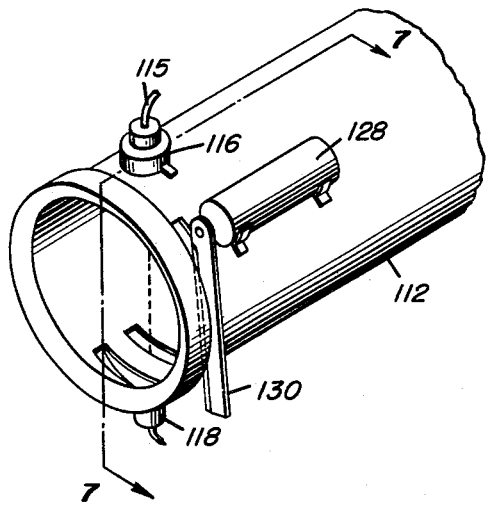
FIG. 6 is a perspective view of a modified form of picker head.

Referring in greater detail to the drawings, wherein similar reference characters refer to similar parts, there is shown in FIG. 4 a picker and transporter assembly generally designated 10. This assembly comprises a picker head 12 and a fruit transporter 14 in operative connection with each other.

The picker head 12 comprises a front cylindrical tube 16 having an inwardly inclined cushioned peripheral lip 18 of rubber or the like at its open front end mounted thereon by a bifurcated cylindrical rim 19. The tube 16 has screw-threads 20 on its outer periphery adjacent its open rear end. These threads 20 are releasably engaged with screw threads 22 on the periphery of a rear tube 24 adjacent the open front end of said tube 24 when said tube 16 is telescopically received within the tube 24.

The tube 16 is provided internally with a flexible diaphragm 26, of rubber or the like, this diaphragm 26 being spaced from the lip 18 and being provided with a central aperture 28 of predetermined diameter. A plurality of circumferentially spaced metal tabs 30 are connected to the rear surface of the diaphragm 26, adjacent the outer periphery thereof, by rivets or the like, indicated at 32.

The tabs 30 are adapted to contact metal stop plates 34, mounted on the interior of tube 16 by bolts 36, when the diaphragm 26 is pushed inwardly. The bolts 36 serve as binding posts for attachment of wires 38 leading to an electric motor means such as a solenoid 40 supported by feet 42 on the outer surface of tube 16 while wires 39 lead to tabs 30. The stop plates 34 cooperating with the metal tabs 30 on the yieldable rubber diaphragm 26 thus provide a spring loaded switch connecting the wires 38 to the solenoid motor 40 and to any suitable source of electricity to supply electrical power therefor in a conventional manner.

The motor 40 has a shaft 44 on which is mounted a knife blade 46. The blade 46 moves, during its actuation, through a slot 48 in the tube 16 between the lip 18 and the diaphragm 26. Obviously, any suitable type of blade may be used.

In the tube 24 (as best seen in FIG. 4) is provided a series of centrally apertured rubber diaphragms 50 similar to the diaphragm 26, but without the metal tabs 30.

The head 12 is adapted to be coupled to a suction tube or intermediate conduit 52 (see FIG. 4) which is, in turn, coupled, as at 54, to a sleeve 56 extending from an inlet opening in a suction fan housing 58. In this housing 58, at the opposite end from sleeve 56, is a fan 60 mounted on a shaft 62 extending through a bearing sleeve 64 to the outside of the housing 58. On the outside of the housing 58, the shaft 62 is provided with a pulley 66 which is connected by an endless belt 68 to a pulley 70 mounted on a shaft 72 extending from a motor 74 mounted on a platform 76 supported by angle bars or beams 78.

The sleeve 56 opens into a fruit receiving chamber 80 defined at its top by an inclined screen 82 which separates the chamber 80 from the fan chamber. The chamber 80 is defined at its bottom by arcuate trap doors 84 hinged to housing 58 by hinges 86. These doors 84 separate the chamber 80 from a lower hopper 88 supported by the beams 78 to which it is attached by bolts 90. The bottom of hopper 88 is defined by trap doors 92 mounted on hinges 94 and having handles 96.

The doors 84 are normally open and the doors 92 are normally closed. However, there is provided a linkage between these doors, such linkage (not shown, but of standard type), is so arranged that when the doors 92 are opened, the doors 84 will automatically close and when the doors 92 are closed, the doors 84 will automatically open. The doors are normally maintained in closed position by any suitable conventional latching means (not shown). Any other desirable means other than linkage may be used if preferred.

In operation, the device is moved, either by hand or by vehicle, to the area where the crops are to be picked. The motor 74 is then energized and the fan 60 provides a suction through the head 12. As a fruit, such as the orange 100 (shown in FIG. 2) is drawn against the apertured diaphragm 26, after passing through the opening defined by lip 18, it not only pushes the diaphragm 26 back to engage the tabs 30 against the stops or switch 34 to close the circuit energizing the knife blade motor 40, but also fills the aperture 28 of the diaphragm whereby it increases the force of the suction in the head 12. This places the stem 102 of the fruit under tension so that when the motor 40 is actuated, the blade 46 easily slices through the stem 102. As soon as this happens, the increased suction acts to pull the fruit 100 through the aperture 28. The similar apertured diaphragms 50 in the tube 24 momentarily increase the efficiency of the suction, only permitting the fruit 100 to slip when the force of the suction has reached a desired point. This provides a higher velocity to the moving fruit 100, enabling it to overcome small inclines and the like.

The fruit 100 then is pulled through the tube 52 and into the chamber 80 under the screen 82. This screen 82 permits the flow of air to the fan 60 while preventing egress of the fruit, leaves or other solid residue. With the doors 84 open, the fruit falls into the hopper 88 whose doors 92 are closed. When the hopper 88 becomes full, the handles 96 are used to open the doors 92, which automatically acts to close doors 84. The fruit falling from the hopper 88 preferably drop onto a conveyor (not shown) and are moved to a collecting station for further processing.

In the embodiment of the invention described above and illustrated in the drawings, the use of flexible sealing diaphragms, such as shown at 26, are provided. However, it is possible to utilize the inventive concept herein by eliminating the diaphragm 26 and having the fruit 100 push back only the tabs 30, the force of the suction provided by the fan 60 being sufficient to momentarily tension the stems 102 for the action of the blade 46, and to then pull the fruit through the head 12.

Figure 7:
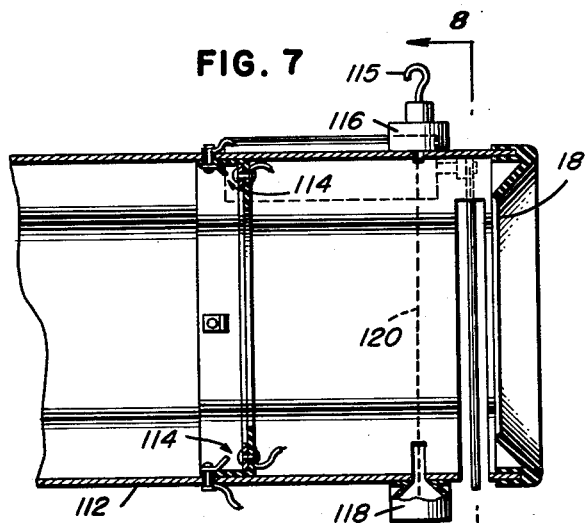
FIG. 7 is a longitudinal sectional view on line 7—7 of FIG. 6.
Figure 8:
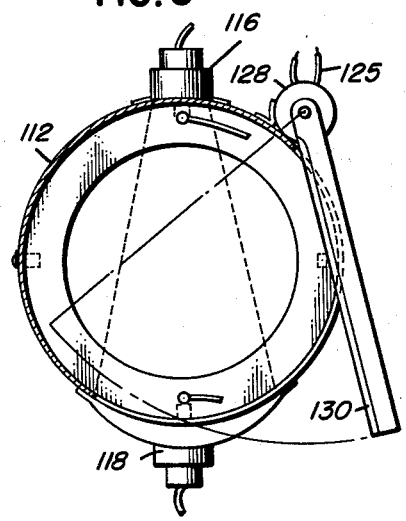
FIG. 8 is a transverse sectional view on line 8—8 of FIG. 7.

To insure that the knife blade will be sure to cut only the stem and not the fruit, and that the stem will be cut close to the fruit, the modification of the picker head shown in FIGS. 6, 7 and 8 may be used in place of the head 12 shown in FIGS. 1 to 4 inclusive.

Figure 9:
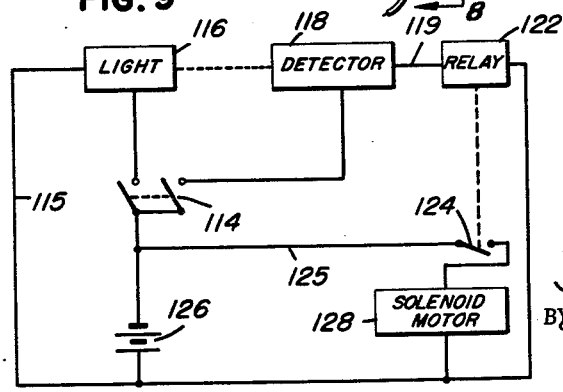
FIG. 9 is block diagram of the photoelectric cell circuit controlling the stem cutting operation.

In this head 112, the fruit passing therethrough actuates the spring loaded switch lever 114, of the same construction as the spring loaded switch 34, described above, to complete a circuit 115 to the photoelectric cell light 116, as well as to the photoelectric cell detector 118. However, as the fruit is still between light 116 and detector 118 interrupting the light beam 120, the detector remains inactive until the fruit clears the light beam 120 permitting the beam 120 to reach detector 118. When this happens, the circuit 119 is complete and relay 122 holds spring switch 124 in circuit completing position against the bias of its spring, completing the circuit 125 from electricity source 126 to solenoid motor 128 for blade 130 to cut through the stem 102 of the fruit, the body 100 of the fruit now being safely past the path of the blade 130. The relay 122 and the switch 124 would obviously be physically attached on the head 112, while the electricity source 126, connected thereto by the wires as diagramatically shown in FIG. 9, would be physically located wherever convenient, such as the platform 76 for the motor 74, and of course, may be the same source of electricity as that for the motor 74, all as well known in the art. The fruit 100, then free from its stem 102, is pulled by the suction past the spring switch lever 114, releasing it to circuit interrupting position, the light beam 120 is extinguished, the relay 122 releases the spring switch 124, and the blade 130 is released again to ready position as shown in FIG. 6.

Obviously, any suitable type of photoelectric cell such as a "Photran" with a suitable circuit may be used, to insure that the solenoid motor actuating the blade will operate on the stem 102 only after the fruit 100 has cleared the path of the blade 130. Likewise, any suitable electric motor means may be used in place of the solenoid motor 128, so long as a suitable circuit therefor is provided, and the term "electric motor means" defines any suitable blade actuating electrical means.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fruit picking assembly comprising, in combination, a picker head, and a suction and collection unit operatively connected to said picker head, said picker head being generally tubular and having an open front end and an open rear end connected by an intermediate conduit to said suction and collection unit, a knife blade operatively connected to said picker head and movable through a path transverse to the longitudinal axis of said picker head, an electrically operated motor means operatively connected to said blade, contact means in said picker head including at least one pair of electrical contacts normally out of engagement but arranged to be engaged upon movement of a solid object into said open front end, said electrical contacts being positioned to establish an electrical circuit between said motor means and a source of electrical energy when engaged, said intermediate conduit leading into a housing of said suction and collection unit, said housing defining a fruit receiving and a suction chamber, a foraminous screen separating said fruit-receiving chamber from said suction chamber, a suction fan in said suction chamber, drive means operatively connected to said suction fan, and a fruit collecting hopper in selective communication with said fruit-receiving chamber.

2. The assembly of claim 1, there being a pair of trap doors defining the bottom of said fruit-receiving chamber, said hopper underlying said fruit-receiving chamber, a pair of trap doors defining the bottom of said hopper, the trap doors of said fruit-receiving chamber being operatively connected to the trap doors of said hopper to alternately open and close with each other.

3. The assembly of claim 1, said electrical circuit including photoelectric cell means providing a light beam intersecting the path of the fruit closely adjacent the path of the blade delaying the actuation of said blade operating motor means until the friut has cleared the path of the blade to thereby cut the stem close to the fruit.

4. The assembly of claim 1, and an apertured sealing diaphragm within said open front end of the picker head rearwardly of the path of movement of said blade, said diaphragm being connected to at least one of said electrical contacts for movement therewith.

5. The assembly of claim 1, and a series of centrally apertured, sealing diaphragms in axially spaced arrangement within said conduit.

6. The assembly of claim 1, said picker head comprising a pair of tubes, one tube being telescopically receivable within the other and means releasably connecting said tubes in such telescoped position.

7. A fruit picker head for use in a picker assembly, said picker head being generally tubular and having an open front end and an open rear end, a knife blade operatively connected to said picker head and movable through a path transverse to the longitudinal axis of said picker head, an electrically operated motor means operatively connected to said blade, and electrical contacts in said picker head, said contacts including at least one pair of contacts normally out of engagement with each other but arranged to be engaged upon movement of a fruit through said open front end, said contacts being positioned to close an electrical circuit between said motor means and a source of electrical energy when engaged, said electrical circuit including photoelectric cell means providing a light beam intersecting the path of the fruit through said picker head closely adjacent the path of the blade delaying the actuation of said blade operating motor means until the fruit has cleared the path of the blade to thereby cut the stem close to the fruit.

8. The fruit picker head of claim 7, and an apertured sealing diaphragm within said open front end rearwardly of the path of movement of said blade, said diaphragm being connected to at least one of said contacts for movement therewith.

9. The fruit picker head of claim 7, said head including a pair of tubes one telescopically receivable within the other, and means releasably connecting said tubes in such telescoped position.

10. A fruit picker head for use in a picker assembly, said picker comprising a generally cylindrical member having an open front end for receiving fruit therethrough, an open rear end, a fruit conveyor tube connected to said open rear end, a bifurcated cylindrical cushioned rim mounted on said open front end, an inwardly inclined lip extending from said rim, an electric motor means mounted on said cylindrical member, a knife blade operatively mounted on the said electric motor means, said cylindrical member having a partly circumferential slot in one side thereof in the path of said knife blade adjacent said inclined lip permitting said knife blade to operate through said slot and through the stem of a fruit that is extending through said inclined lip, and motor circuit completing means in said cylindrical member actuated by the fruit extending through said lip.

11. The fruit picker head of claim 10, said electrical circuit including photoelectric cell means providing a light beam intersecting the path of the fruit closely adjacent the path of the blade delaying the actuation of said blade operating motor means until the fruit has cleared the path of the blade to thereby cut the stem close to the fruit.

12. A fruit picker head for use in a picker assembly, said picker comprising a generally cylindrical member having an open front end for receiving fruit therethrough, an open rear end, a fruit conveyor tube connected to said open rear end, a bifurcated cylindrical cushioned rim mounted on said open front end, an inwardly inclined lip extending from said rim, a centrally apertured flexible diaphragm mounted within said cylindrical member and spaced from said inwardly inclined lip, the aperture in said diaphragm being stretchable to pass fruit therethrough, an electrical motor means mounted on said cylindrical member, a shaft operatively mounted in said motor means, a knife blade mounted on said shaft of said motor means, said cylindrical member having a partly circumferential slot in one side thereof in the path of said knife blade adjacent, said slot permitting said knife blade to operate therethrough and through the stem of a fruit that is extending within said cylindrical member, and motor electrical circuit completing means in said cylindrical member actuated by the fruit extending through said lip.

13. The fruit picker head of claim 12, said electrical circuit including photoelectric cell means providing a light beam intersecting the path of the fruit closely adjacent the path of the blade delaying the actuation of said blade operating motor means until the fruit has cleared the path of the blade to thereby cut the stem close to the fruit.

References Cited in the file of this patent
UNITED STATES PATENTS

| | | |
|---|---|---|
| 2,545,072 | Denman | Mar. 13, 1951 |
| 2,650,464 | Bernheim | Sept. 1, 1953 |
| 2,685,163 | Taylor | Aug. 3, 1954 |
| 2,978,859 | Tubbs | Apr. 11, 1961 |